(12) United States Patent
Wang et al.

(10) Patent No.: US 11,327,687 B2
(45) Date of Patent: May 10, 2022

(54) ENCODING DATA ARRAYS

(71) Applicant: Arm Limited, Cambridge (GB)

(72) Inventors: Jian Wang, Lund (SE); Hakan Lars-Goran Persson, Bjarred (SE)

(73) Assignee: Arm Limited, Cambridge (GB)

( * ) Notice: Subject to any disclaimer, the term of this patent is extended or adjusted under 35 U.S.C. 154(b) by 154 days.

(21) Appl. No.: 16/823,044

(22) Filed: Mar. 18, 2020

(65) Prior Publication Data

US 2021/0294535 A1    Sep. 23, 2021

(51) Int. Cl.
| | |
|---|---|
| *G06F 3/06* | (2006.01) |
| *H04N 19/88* | (2014.01) |
| *H04N 19/182* | (2014.01) |

(52) U.S. Cl.
CPC .......... *G06F 3/0661* (2013.01); *G06F 3/0604* (2013.01); *G06F 3/0608* (2013.01); *G06F 3/0673* (2013.01); *H04N 19/182* (2014.11); *H04N 19/88* (2014.11)

(58) Field of Classification Search
CPC .... G06F 3/0604; G06F 3/0608; G06F 3/0661; G06F 3/0673; H04N 19/182; H04N 19/40; H04N 19/42; H04N 19/436; H04N 19/88
See application file for complete search history.

(56) References Cited

U.S. PATENT DOCUMENTS

| | | | | |
|---|---|---|---|---|
| 8,542,939 B2 * | 9/2013 | Nystad | .................. | H04N 19/96 382/240 |
| 2013/0121421 A1* | 5/2013 | Bruns | .................. | H04N 19/436 375/240.25 |
| 2013/0195352 A1* | 8/2013 | Nystad | ................. | H04N 19/197 382/166 |
| 2014/0254929 A1* | 9/2014 | Wu | ...................... | H04N 19/129 382/166 |
| 2019/0028722 A1* | 1/2019 | Choi | ................... | H04N 19/182 |

OTHER PUBLICATIONS

Uhrenholt, et al., "Cache Arrangement for Data Processing Systems," U.S. Appl. No. 16/742,495, filed Jan. 14, 2020.

* cited by examiner

*Primary Examiner* — Mohammed S Rahaman
(74) *Attorney, Agent, or Firm* — Vierra Magen Marcus LLP

(57) ABSTRACT

When operating a data processing system comprising a data encoder operable to perform a first encoding scheme that is configured for processing sets of data arranged in a first data format, for a plurality of sets of data received in a second, different data format, the bits for at least some of the received plurality of sets of data in the second data format are re-ordered to map the bits for the at least some of the received plurality of sets of data in the second data format into the first arrangement of bits associated with the first data format to thereby generate from the received plurality of sets of data in the second data format one or more sets of data in the first data format for processing using the first encoding scheme.

21 Claims, 7 Drawing Sheets

FIG. 6

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| R[4:0] | | | | | G[5:0] | | | | | | | B[4:0] | | | |
| G[5] | R[4] | G[4] | R[3] | G[3] | B[3] | R[2] | G[2] | B[2] | R[1] | G[1] | B[1] | R[0] | G[0] | B[0] | |

FIG. 7

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|---|---|---|---|---|---|---|
| R1[3:0] | | | | G1[3:0] | | | | B1[3:0] | | | | A1[3:0] | | | | R0[3:0] | | | | G0[3:0] | | | B0[0] |
| R1[3] | R0[3] | R1[2] | R0[2] | R1[1] | R0[1] | R1[0] | R0[0] | G1[3] | G0[3] | G1[2] | G0[2] | G1[1] | G0[1] | G1[0] | G0[0] | B1[3] | B0[3] | B1[2] | B0[2] | B1[1] | B0[1] | B1[0] | B0[0] |

FIG. 8

| 63:56 | 55:48 | 47:40 | 39:32 | 31:24 | 23:16 | 15:8 | 7:0 |
|---|---|---|---|---|---|---|---|
| R[15:0] | | G[15:0] | | B[15:0] | | A[15:0] | |
| R[15:8] | G[15:8] | B[15:8] | A[15:8] | R[7:0] | G[7:0] | B[7:0] | A[7:0] |

ENCODING DATA ARRAYS

BACKGROUND

The technology described herein relates to data processing systems such as graphics processing systems, and in particular to the operation of a data encoder (circuit) for encoding data in such data processing systems.

Graphics processing operations, which may be performed by a graphics processor (graphics processing unit (GPU)), typically process data in an uncompressed form. When such operations have produced a particular output (e.g. frame), the output data may then be written to a (e.g. frame) buffer, for example in main memory, for storage before further processing (e.g., display of the frame).

The storage and accessing of the uncompressed data in use can place relatively high storage and/or bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

To reduce the amount of data that needs to be transferred to and from memory, and the associated power cost of moving such data back and forth, during a graphics processing operation, the data may be compressed, e.g., before being written to memory. This allows the data to be stored in a compressed (encoded) format. When the data is required for further processing, the compressed data is then read from memory and decompressed (decoded), such that it is then in a suitable format for the graphics processing operations.

In order to facilitate this operation, a suitable data encoder may thus be included in the graphics processing system, e.g. disposed between the graphics processor and the memory system within which the compressed data is to be stored. Various examples of encoding schemes exist, including for instance that described in U.S. Pat. No. 8,542,939 (Arm Limited), which are capable of suitably encoding such graphics (or other) data. The data encoder may thus typically include one or more codecs, e.g. that are each respectively operable to perform a (different) suitable such encoding scheme. For example, one codec may be configured to perform an appropriate variable rate compression scheme, with another codec being configured to perform an alternative, e.g. fixed rate compression scheme.

Although an example has been given above in the context of graphics processing, similar considerations also apply to various other instances of data processing where it is desired to reduce the amount of data needed for the storage and/or transmission of a certain piece of information, and there are various other examples of situations where such data encoding may be employed.

Nevertheless, the Applicants believe that there remains scope for improvements to such encoding operations in data processing systems.

BRIEF DESCRIPTION OF THE DRAWINGS

Various embodiments of the technology described herein described herein will now be described by way of example only and with reference to the accompanying drawings, in which:

FIG. 6 shows an example of a first data bit interleaving scheme according to an embodiment of the technology described herein;

FIG. 7 shows an example of a second data bit interleaving scheme according to an embodiment of the technology described herein;

FIG. 8 shows an example of a third data bit interleaving scheme according to an embodiment of the technology described herein.

Like reference numerals are used for like elements and features in the Figures, where appropriate.

DETAILED DESCRIPTION

Figure 1:
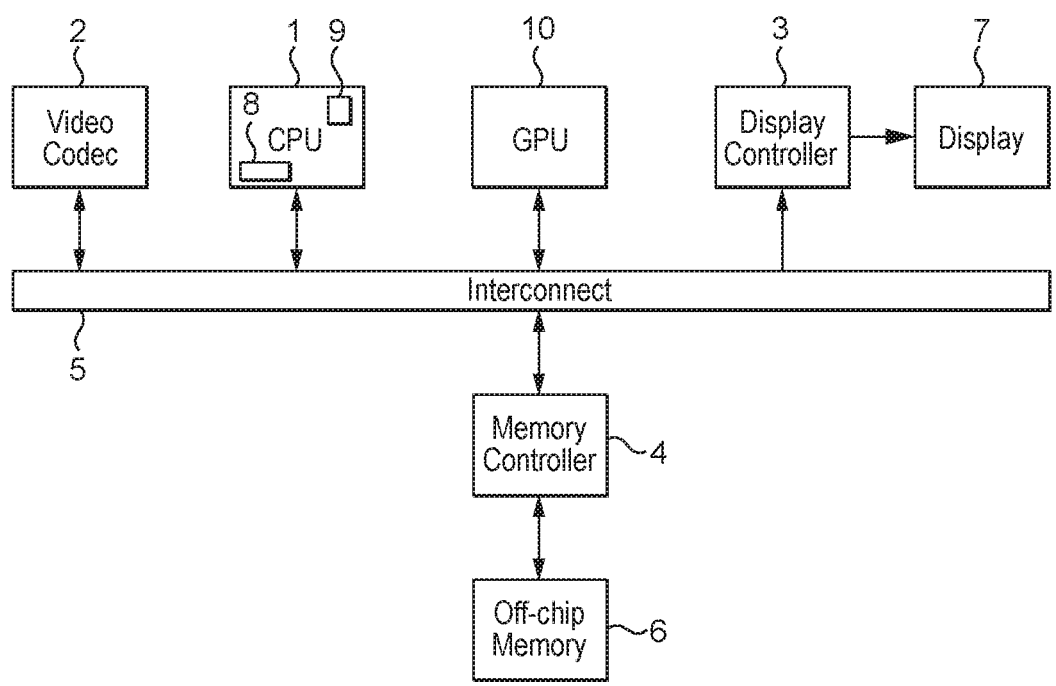
FIG. 1 shows an exemplary graphics processing system in which the technology described herein may be implemented.

A first embodiment of the technology described herein comprises a method of operating a data processing system when processing arrays of data elements, the data processing system comprising:

a data encoder operable to perform a first encoding scheme that is configured for processing sets of data arranged in a first data format, the first data format using a first arrangement of bits to represent an element of an array of data elements, the data encoder being operable to encode one or more sets of data provided in the first data format as an encoded data packet using the first encoding scheme;

the method comprising:

receiving for encoding by the data encoder a plurality of sets of data in a second, different data format, the second data format representing an element of an array of data elements using a second, different arrangement of bits, each of the received sets of data in the second data format thus comprising a respective sequence of bits representing an associated element of an array of data elements in the second format;

re-ordering bits for at least some of the received plurality of sets of data in the second data format to map the bits for the at least some of the received plurality of sets of data in the second data format into the first arrangement of bits associated with the first data format to thereby generate from the received plurality of sets of data in the second data format one or more sets of data in the first data format; and the data encoder processing the generated sets of data in the first data format using the first encoding scheme to thereby encode the plurality of sets of data received in the second data format as one or more encoded data packets using the first encoding scheme.

A second embodiment of the technology described herein comprises a data processing system for processing arrays of data elements, the data processing system comprising:

a data encoder configured to perform a first encoding scheme that is configured for processing sets of data arranged in a first data format, the first data format using a first arrangement of bits to represent an element of an array of data elements, the data encoder being configured to encode one or more sets of data provided in the first data format as an encoded data packet using the first encoding scheme; and a data conditioning circuit associated with the data encoder, wherein the data conditioning circuit is configured to re-order bits for at least some of a plurality of sets of data having a second, different data format, the second data format representing an element of an array of data elements using a second, different arrangement of bits, to map the bits for the at least some of the plurality of sets of data in the second data format into the first arrangement of bits associated with the first data format to thereby generate from the plurality of sets of data in the second data format one or more sets of data in the first data format, and to provide the generated sets of data in the first data format to the data encoder for processing.

The technology described herein relates to the operation of a data encoder within a data processing system that is configured to encode data into an encoded (e.g., and in an embodiment, compressed) form, e.g. to reduce data storage and/or transmission requirements. Thus, data that is generated and/or required during the data processing operations may first be passed to the data encoder, that then performs the desired encoding of the data, before the encoded data is then, e.g., written out to a memory system (which may be the main memory, or other storage (e.g. a cache) within the memory hierarchy), or transmitted to another processing unit, etc.

In particular, in the technology described herein, sets of data received by the data encoder in one data format are 'conditioned' (e.g. by suitably re-ordering the bits thereof) into another, different data format, e.g. to facilitate an improved encoding throughput, and in an embodiment also a more efficient encoding of the data per se, as will be explained further below.

In this respect, the technology described herein recognises that data encoders are typically configured for (optimally) processing data in a first, predefined format (or a number of predefined formats, e.g. where the data encoder is operable in a number of different encoding modes). For instance, the data encoder typically includes one or more codecs, e.g. that are each respectively operable to perform a (different) encoding scheme, with each encoding scheme being designed for use with a certain data format. The data encoder may thus be (and typically is) designed to optimally process data in units of data (a 'set of data') having a certain size (number of bits) associated with a particular data format, depending on the encoding scheme being used.

Thus, in the technology described herein, a (and each) data element in an array of data elements is associated with a set of data representing the data values for the data element, and this data may be stored in a number of different data formats, e.g. using different arrangements (and numbers) of bits to represent the data values for the data element in question.

For example, in an embodiment, the arrays of data elements represent image data, and the data elements may therefore represent individual pixels within the image (although various other arrangements would be possible and the elements may generally represent any sub-units of the image). In that case, and in an embodiment, the sets of data that are processed in the technology described herein represent individual pixels, with each pixel having an associated set of data containing data representing the (e.g.) colour values for the pixel in question (e.g. values for the RGB(A) components, where the pixel data is stored in an RGB(A) pixel format).

Various different formats exist for storing pixel data. For example, a pixel may be represented using an 'RXGYBZAW' pixel format, wherein X bits are used to represent the red (R) channel, Y bits are used to represent the green (G) channel, Z bits are used to represent the blue (B) channel, and W bits are used to represent the alpha (A, 'transparency') channel. Typical examples of this pixel format include R8G8B8 pixel formats (using 24-bits per pixel), R8G8B8A8 (using 32-bits/pixel), R5G6B5 (using 16-bits/pixel), etc.

Other pixel formats also exist which may represent the image data using different colour spaces including, e.g., YUV formats, etc.

The data encoder may thus be preconfigured to (optimally) handle data elements (e.g. pixels) in a certain format (e.g., and size), with the sets of data representing the data elements of this format (size) being the largest components that can pass through the encoding pipeline. For example, a processing channel of the data encoder may be designed to be able to process (exactly) a set of data representing one data element (e.g. pixel) of that format (size) in a single cycle (such that the data encoder can process 'N' data elements (e.g. pixels) of that format (size) where there are 'N' parallel processing channels), with this therefore determining the maximum encoding (e.g. pixel) throughput.

Thus, in embodiments, the data encoder is configured to process 'N' data elements (i.e. or sets of data representative thereof) in the first data format in a single processing cycle, and this is the maximum number of data elements that can be processed in a single cycle (such that the encoding throughput is constrained by the number of data elements that can be processed in a single cycle).

The Applicants have thus recognised that the encoding throughput and performance for encoding a certain amount of data (e.g. a single memory page, a cache line, etc.) may depend on the data format in which data is received by the data encoder. For example, a 256-byte cache line in R5G6B5 format contains 128 pixels, whereas in R8G8B8A8 format it would contain 64 pixels, and in R16G16B16A16 it would contain only 32 pixels. Accordingly, when the data encoder has a maximum throughput of 16 pixels per cycle, encoding the cache line in R5G6B5 format will take 8 cycles, whereas encoding in R8G8B8A8 format will take 4 cycles, and R16G16B16A16 only 2 cycles.

However, the data that is generated in use by the data processing system may be generated and provided for encoding by the data encoder in a second, different data format (e.g. where data is generated using a different pixel format, as described above). For instance, it may be the case that, depending on the application generating the data that is to be encoded, the sets of data that are received for encoding by the encoder are received in a different data format, e.g. having a different number of and arrangement of bits, to that which the encoder is designed to handle.

For example, the data encoder may be designed to process pixels in an R8G8B8A8 (32-bit) format, whereas pixel data is received to be encoded in an R5G6B5 (16-bit) format. As another example, the data encoder may be designed to process pixels in an R8G8B8A8 format, whereas pixel data is generated in use in a YUV pixel format. In use, data may be generated and provided to the data encoder in a range of different formats.

In order to operate effectively within a data processing system a data encoder generally needs to be able to handle all data (e.g. pixel) formats that may be generated by the data processing system in use. However, designing a data encoder to be able to efficiently handle all possible data formats that may be required to be encoded by the data processing system increases the complexity (and hence area) of the data encoder, and may therefore be impractical.

The Applicants have further recognised in this regard that the data encoder may still be capable of processing data in a format having a different (smaller) size than the size of data element that the data encoder is configured for processing, e.g., by padding out the set of data with zeros, but that this may not be the most efficient use of encoding resource, since the encoding throughput is still constrained by the number of data elements (e.g. pixels) that can be processed in a single processing cycle, and if the size of the data element does not match the data encoder, the encoding pipeline is therefore not fully utilised.

Thus, embodiments of the technology described herein use bit re-ordering, including bit interleaving, methods to reorder the pixel data by shuffling the bits for the received data packets to better match the arrangement of bits used for the format that the data encoder is designed for, and to thereby provide a more efficient use of the available encoding resource, e.g. by ensuring that the encoding pipeline is better, and in an embodiment fully, utilised.

Further, it is a benefit of the technology described herein that this can be achieved by suitable re-ordering of the bits (alone), e.g. and without requiring additional hardware complexity in the data encoder.

This also means that data can be encoded in a single, common format (i.e. the data format that the data encoder is designed for), regardless of the data format in which it was originally generated/received, e.g. in order to provide a more consistent encoding process.

For example, when multiple data elements are received in a format that is smaller (i.e. uses fewer bits) than the size of data element that the encoder is configured to handle (but with each of the received data elements typically having the same size as one another, although this need not be the case and the technology described herein may also in principle be used for simultaneously handling a number of different data formats), the bits for some or all of the data elements may thus be reshuffled appropriately to map the bits for the received data elements in whatever data format they are arranged into the arrangement of bits used for the target data format that the encoder is configured to handle.

Plural data elements can then be processed by the data encoder together, e.g. in a single processing step, as one or more "pseudo" data elements of the larger size that the encoder is configured to handle.

For example, if the encoder is configured to handle, e.g., R8G8B8A8 (32-bit) pixels, e.g. such that each processing channel of the data encoder is operable to process one 32-bit pixel in a single processing cycle, but the input data is provided in the form of R5G6B5 (16-bit) pixels, by appropriate re-ordering of the bits, it is possible to effectively combine together two of the pixels defined in the R5G6B5 (16-bit) format into one single pixel in an R8G8B8A8 (32-bit) representation. The two pixels in the R5G6B5 (16-bit) format can then be processed together as a single "pseudo" pixel in the R8G8B8A8 (32-bit) format in one processing cycle (thereby effectively halving the required number of processing cycles).

Corresponding techniques can be used for appropriately mapping any size pixels into the desired arrangement of pixels for processing by the data encoder.

Thus, in embodiments, the second data format uses fewer bits to represent an associated data element (e.g. pixel) than are used to represent a corresponding element in the first data format that the data encoder is configured to handle. The re-ordering thus in an embodiment comprises combining two or more sets of data in the second data format, e.g. representing a corresponding two or more data elements, into one or more sets of data in the first data format, and in an embodiment into a single set of data in the first data format. The set(s) of data in the first data format generated by this re-ordering thereby effectively represent "pseudo" data elements in the first data format. The set of data representing the "pseudo" data element in the first data format can then be (and is) processed by the data encoder using the first encoding scheme associated with the first format.

In the technology described herein, sets of data representing data elements in the second format are thereby 'conditioned' into sets of data representing "pseudo" data elements in the first format. It will be appreciated that the pseudo data elements are not generated in the first data format, and so the arrangement of bits may not directly represent real data values for a particular data element, but the set of data in the first data format representing the pseudo data element instead contains data associated with the plural data elements represented by the sets of data received in the second format but with this data now arranged according to the first data format for processing reasons.

Once the data has been conditioned into a set of data in the first data format, the set of data in the first data format (i.e. representing a pseudo data element in the first data format) can then be processed accordingly by the data encoder, e.g. using the first encoding scheme, in the same way that would be done for data that had been originally provided in the first data format. That is, following the re-ordering of the bits to generate the pseudo data elements in the first data format, it will be appreciated that the pseudo data elements in the first data format can then be, and in an embodiment are, passed into the encoding pipeline and encoded in exactly the same manner as 'real' data elements in the first data format.

In other words, in the technology described herein, rather than attempting to process the data in the format that it is received by the encoder, which the technology described herein further recognises may be relatively inefficient, where the data that is to be encoded has a smaller size than the size of data packet for which the encoder is configured to process, some or all of the received sets of data may be combined together into a larger set of data that matches the size of data element which the encoder is configured to process.

In this way the encoding throughput can be increased as by matching the size of the data elements provided to the data encoder to the maximum size of data element that the data encoder can process in a single cycle, such that the encoding pipeline is filled with the largest units of data it can handle, it can be ensured that the encoding pipeline is better, or fully, utilised, such that fewer processing cycles are required to encode a particular amount of data (and such that the encoding speed is therefore increased).

Re-ordering the bits may in some cases also help to reduce storage requirements. For instance, by combining multiple data elements into a single, larger "pseudo" data element, the total number of data elements can be reduced and this may in turn reduce the amount of data that needs storing. For example, if the encoding scheme generates associated data, e.g. in the form of a header, for each data element, reducing the number of data elements will in turn reduce the number of associated headers, and thus reduce storage requirements.

The re-ordering of the bits also opens up additional possibilities for enhancing the encoding itself (i.e. to provide a more effective encoding, e.g. with a higher compression ratio, as well as improving the encoding throughput in the manner described above).

For example, there are various examples of encoding schemes that exist that attempt to take advantage of the (expected) properties of a data array to improve the encoding, for example by taking advantage of (expected) spatial locality in the data array (for example, for image data, it can be expected that regions (e.g. pixels) of the image that are closer together may be expected to have a similar appearance, and this information may be used to facilitate the encoding).

For instance, many encoding schemes encode data using difference values. So, by grouping together data values with similar values, such that the differences between the values may be lower (or zero), the amount of data required to store the differences can be reduced.

An example of such an encoding scheme is that described in U.S. Pat. No. 8,542,939 (Arm Limited), and in embodiments the data encoder is operable to perform an encoding scheme of this type.

In an embodiment, the re-ordering of the bits is therefore performed to further exploit such expected data similarity, e.g. and in an embodiment, based on data locality, e.g. such that bits representing data elements that are expected to have similar data values, e.g. due to spatial locality, are re-arranged into a set of data in the first data format wherein the arrangement of bits is such that data values that are expected to have similar values are arranged in such a manner that facilitates the encoding.

Thus, in embodiments, the re-ordering of the bits is performed based on expected similarities in the data, e.g. so that data values that are expected to be similar are arranged in such a manner to provide better compression.

It will be appreciated that the arrangement of the bits that 'best' facilitates the encoding may depend on the encoding scheme. However, at least in some embodiments, the re-ordering may comprise arranging together bits where the data values for those bits are expected to be similar as this may facilitate the encoding (especially where the encoding encodes differences between values).

Various embodiments are contemplated in this regard, as will be explained further below.

For example, the re-ordering of the bits may be performed to group together most significant bits and/or to group together least significant bits. This may be done to group together the most significant bits and/or least significant bits for different components of a single data element, or for components from different data elements.

For instance, when the data elements represent individual pixels, e.g. in an RGBA pixel format, it may be expected that is less variation in data values between the most significant bits for the different components than there is between the most significant bits and the least significant bits for a single component, and the re-ordering may be performed based on this expected similarity.

Thus, the bits from different components (e.g. RGBA components) of the same pixel may be interleaved to group together the most significant bits for each component (and/or to group the least significant bits for each component together).

As another example, the re-ordering of the bits may comprise grouping together bits from the same component from different data elements. Again, it might be expected that there is less variation in data values of a single component between different data elements than there is between the data values of different components for a single data element.

In embodiments, combinations of these approaches may be performed, e.g. so that bits may be interleaved to group together most significant bits for the different components from different data elements.

As yet another example, the bits may be re-ordered to move together data values for data elements that are (physically) closer to each other in an array of data elements. For example, a use case for this would be when pixels in an, e.g., YUV format are to be encoded in an RGB format. In that case, it may be desirable to encode a, e.g., 2×2 block of pixels in the YUV format as a plurality of RGB pixels. In that case, the bits representing the YUV components may be re-ordered inside the blocks to effectively group together in the RGB set of data pixels that are physically closer together in the YUV array, as these may generally be expected to have more similar data values.

Other arrangements would of course be possible depending on the data that is being processed and/or the encoding scheme being used.

The Applicants also recognise that in some cases the received data elements may be larger than the size of data element that the encoder is designed to handle. In that case, rather than combining together data for plural data elements into a larger data element for processing, sets of data for one or more data elements(s) of the larger size may be split into smaller sets of data, e.g. representing a plurality of pseudo data elements of the target, lower size, which are then processed accordingly.

For example, when the data encoder is designed to handle pixels in an R8G8B8A8 (32-bit) format, but the data that is to be encoded is received in an R16G16B16A16 (64-bit) format, the 64-bit pixel may be split into two smaller, 32-bit "pseudo" pixels for processing in the R8G8B8A8 format.

Thus, in embodiments, the step of re-ordering the bits for at least some of the received plurality of sets of data in the second data format to map the bits for the at least some of the received plurality of sets of data in the second data format into the first arrangement of bits associated with the first data format comprises re-ordering the bits for one or more sets of data received in the second data format into a plurality of sets of data in the first data format to thereby generate from the one or more sets of data in the second data format a plurality of sets of data in the first data format.

Various optimisations would be possible in this regard. For instance, in a similar fashion as described above, in order to take advantage of expected data similarity, e.g., and in an embodiment, based on spatial locality in the data, when a set of data received in the second data format is split, this is in an embodiment done in such a way to exploit expected data similarity, e.g. such that most significant bits, or similar components, are grouped together for processing.

For example, an R16G16B16A16 pixel may be split into a plurality of smaller pixels in such a manner that all of the bits representing the red (R) component are grouped together into a single set of data in the target data format, and so on. As another example, the most significant bits from each component may be arranged into a single set of data in the target data format, and processed together.

As mentioned above, the array(s) of data elements in an embodiment represent a spatial distribution of values. That is, the array(s) of data elements in an embodiment represents a set of data values that are distributed in the spatial domain.

So, each data element may be represented by a set of data values for the data element associated with a certain position within the spatial distribution. Thus, in embodiments, the array(s) of data elements may (each) correspond to an array of data positions. In embodiments, the array(s) of data elements or positions may correspond to all or part of a desired (e.g. image) output, such as a still image or a video frame (e.g. for display). That is, the array(s) of data elements in an embodiment comprise array(s) of image data, i.e. data that may be used to generate an image for display. Thus, an array of data may in embodiments correspond to a single still image that is to be encoded. In other embodiments an array of data may correspond to a video frame of a stream of video frames that are to be encoded.

Although embodiments relate to data array(s) including image and/or video data, other examples of data array arrangements would be possible if desired and in general the array(s) of data elements may comprise any data array that can suitably or desirably be encoded according to the technology described herein.

Indeed, in any of the embodiments described herein the array(s) of data elements may take any desired and suitable form.

For instance, in general, there may be any desired and suitable correspondence between the data elements or positions and the desired output. For example, the data elements or positions of the array(s) may each correspond to a pixel or pixels of a desired output. However, other arrangements would of course be possible.

The array(s) of data elements can be any desired and suitable size or shape in terms of data elements or positions, but are in an embodiment rectangular (including square).

The data elements may also have any desired and suitable format, for example that represents image data values (e.g. colour values).

In any of the embodiments described herein, the array(s) of data elements may be provided in any desired and suitable way. Embodiments may comprise generating (at least some or all of) the data elements of the array(s). Embodiments may also or instead comprise reading in (at least some or all of) the data elements of the array(s), e.g. from memory.

The data elements of the array(s) may be generated in any desired and suitable way. In embodiments, the data elements of the arrays may be generated by a camera such as a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

Typically, the data elements of the data array(s) may be encoded as "blocks" of data elements, e.g. on a block by block basis. For instance, the array(s) of data elements may be divided into plural blocks to be encoded on a block by block basis. Thus, any reference herein to processing or encoding a data array or data elements of a data array should be considered to include, and typically involves, processing or encoding such blocks of data elements. A "block" may generally comprise an N×M (and in an embodiment an N×N) array of data elements.

Thus, in an embodiment, when encoding an (overall) array of data elements, e.g. representing an entire frame (image), the (overall) array of data elements is divided into a plurality of blocks, and each block is then encoded to provide a corresponding set of encoded data packets. That is, each block of data elements within the larger array of data elements is in an embodiment encoded (compressed) as an encoded data packet (such that an encoded data packet may therefore, and typically does, contain data representing a plurality of data elements, e.g. a plurality of data elements within a block of data elements). Thus, in an embodiment, the data array that is to be encoded comprises a block of data elements from a larger, overall, data array (and this is in an embodiment repeated for each of the plural blocks making up the overall data array). The data packets for each of the blocks can then be suitably combined, in a certain order, into an encoded data stream containing data for the overall array of data elements.

The data elements may comprise difference values, e.g., compared to a reference frame or block. However, more often, the encoding scheme is used for encoding raw data, and the data elements may therefore represent (raw) pixel values.

The encoding may be carried out in any suitable manner depending on the configuration of the data encoding circuit and/or the data that is to be encoded.

For example, as mentioned above, the data encoder may be operable to perform an encoding scheme as described in U.S. Pat. No. 8,542,939 (Arm Limited). However, other encoding schemes could also be used, as appropriate.

The data encoder may be configured to determine how (and whether) to re-order the bits in the manner described above. For example, it may be predetermined that any data received in a particular (second) data format, should be re-ordered into a target (first) data format. The data encoder may thus comprise circuitry for checking the data format of the data received for encoding and then selecting the appropriate re-ordering scheme based on the data format. Alternatively, the re-ordering scheme may be specified, e.g. by a suitable driver.

Various arrangements would be possible in this regard.

In the technology described herein, data is encoded, and can then be stored and/or transmitted in its encoded form, e.g. to reduce memory and/or bandwidth requirements.

When the data that has been encoded is subsequently required to be used, e.g. by a data processor, the encoded data must therefore be suitable decoded (e.g. decompressed) in order to reconstruct the original data (or at least a representation thereof, e.g. where lossy encoding is used).

Thus, the data processing system may also include a data decoder (which may be the same component as the data encoder, or may be a separate component) configured for decoding encoded data packets.

In general, the decoder is operable to decode the encoded data to recover the original source data (e.g. image) that was encoded, and then use (e.g. display) this data as desired. Thus, once the encoded data has been decoded, the decoder may then be configured to display, or output for display, data obtained using the decoded data.

Thus, in embodiments, when data that has been encoded as an encoded data packet in the manner of the technology described herein is subsequently to be used, the encoded data is passed to a data decoder, which decodes the encoded data packet accordingly.

The technology described herein also extends to corresponding methods and apparatuses for decoding data encoding data arrays (e.g. encoded according to the technology described herein) per se.

The decoding process essentially works in reverse to the encoding of the technology described herein.

For instance, the decoder is in an embodiment configured to decode data in the first data format, e.g. by implementing a decoding scheme that reverses the first encoding scheme. Thus, the decoder may (initially) decode an encoded data packet into one or more decoded sets of data in the first data format.

In order to reconstruct the original data, i.e. in the original, second data format, the decoder is therefore in an embodiment (also) associated with a data conditioning circuit, similar to that described above in relation to the data encoder, but that is configured to re-order bits for the decoded sets of data in the first data format to map the bits into the second arrangement of bits associated with the second data format to thereby generate from the decoded sets of data in the first data format one or more sets of data in the second data format (representing the original data in the second data format that was encoded).

It will be appreciated that the re-ordering performed during the decoding should be the reverse of the re-ordering performed during the encoding.

To facilitate this operation, the decoder may thus be provided with information for identifying the re-ordering of the bits performed during the encoding. This information may suitably be included as part of, or along with, the encoded data packets, e.g. to allow the decoder to identify when this has been done. For example, this information may be provided as metadata, e.g. in a suitable header, or as side-band information.

Where such information is provided, the decoder is then able to identify using such information that the bits have been re-ordered, and how, and can then perform an appropriate reverse re-ordering operation to reconstruct the original data array in the second data format.

Other arrangements would however be possible. For instance, as mentioned above, there may be a predetermined re-ordering based on a fixed mapping such that data received in a particular (second) data format is always re-ordered into a target (first) data format, and the decoder may be aware of such fixed mapping. Or, the re-ordering scheme may be specified, e.g. by a suitable driver.

Another embodiment of the technology described herein comprises a method of operating a data processing system when processing arrays of data elements, the data processing system comprising:

a data decoder operable to perform a first decoding scheme that is configured for decoding one or more encoded data packets into one or more sets of data arranged in a first data format, the first data format using a first arrangement of bits to represent an element of an array of data elements;

the method comprising:

receiving an encoded data packet for decoding by the data decoder;

the data decoder processing the encoded data packet using the first decoding scheme to thereby generate one or more decoded sets of data in the first data format; and re-ordering bits for the decoded sets of data in the first data format into a second, different arrangement of bits associated with a second, different data format, the second data format representing an element of an array of data elements using the second arrangement of bits, to thereby generate from the decoded sets of data in the first data format one or more sets of data in the second data format.

A further embodiment of the technology described herein comprises a data processing system for processing arrays of data elements, the data processing system comprising:

a data decoder operable to perform a first decoding scheme that is configured for decoding one or more encoded data packets into one or more sets of data arranged in a first data format, the first data format using a first arrangement of bits to represent an element of an array of data elements; and a data conditioning circuit associated with the data decoder, wherein the data conditioning circuit is configured to re-order bits for at least some of a plurality of decoded sets of data in the first data format from the data decoder to map the bits into a second, different arrangement of bits associated with a second, different data format, the second data format representing an element of an array of data elements using the second arrangement of bits, to thereby generate from the sets of data in the first data format one or more sets of data in the second data format.

As will be appreciated from the above, the technology described herein is, in an embodiment, implemented in a graphics processing system comprising a memory system, a cache system, and a graphics processor (a graphics processing unit (GPU)). Data for performing graphics processing operations (e.g. to generate a render output (e.g. image to be displayed)) is, in an embodiment, stored in a memory of the memory system.

The graphics processor is, in an embodiment, arranged to trigger the fetching of required data from the memory and its storing in the cache system, in the manner described above. The graphics processor then, in an embodiment, reads required data from the cache system for performing graphics processing operations (e.g. generating the render output), e.g. in the manner described above. The output from the graphics processing operations (e.g. the render output), once generated in this way, is then written back to the memory system via the cache system, and, in an embodiment, displayed, e.g. on a display of an electronic device, such as a phone, tablet, television, computer screen or the like.

The graphics processor (graphics processing unit) may, and in an embodiment does, implement and execute a graphics processing pipeline to perform graphics processing operations.

The graphics processing pipeline may include, and in an embodiment does include, any one or more, and in an embodiment all, of the processing stages that a graphics processing pipeline may normally include, such as, and in an embodiment, a primitive setup stage, a rasteriser, a renderer (in an embodiment in the form of or including a programmable fragment shader (a shader core)).

In an embodiment, the graphics processor (processing pipeline) also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The technology described herein may be used in and with any suitable and desired graphics processing system and processor.

As one example, the technology described herein may be used with tiled renderers (tile-based graphics processing systems). Thus, in an embodiment, the graphics processor (processing pipeline) is a tiled-based graphics processor (processing pipeline). Other arrangements would of course be possible.

However, in general, the encoding/decoding processes described herein in any embodiment may be performed within the context any desired and suitable data processing system.

In an embodiment, the various functions of the technology described herein described herein are carried out on a single data (e.g. image) processing platform that provides and/or uses the arrays of data elements.

For example, the encoding and decoding apparatuses discussed above may generally be provided as part of an image and/or video processing system that includes a camera, such as a digital camera, mobile phone or tablet.

The data processing apparatus described herein in any embodiment may comprise, or may be, or may form part of, a system on chip (SoC).

In an embodiment, the data processing system and/or processor also comprises, and/or is in communication with, one or more memories and/or memory devices that store the data described herein, and/or that store software for performing the processes described herein. The data processing system and/or processor may also be in communication with a host microprocessor, and/or with a display for displaying images based on the data generated by the processor (processing pipeline).

The memory referred to herein may be any desired and suitable memory of or for the data processing apparatus. The memory may be external to the data processing apparatus, e.g. video processor and/or system on chip (SoC). The memory may be, for example, main system memory.

The encoding/decoding apparatus of the technology described herein described herein may be part of an overall data processing system that includes, for example, a host (e.g. central) processor. The host processor may, for example, execute applications that require data processing by the encoding/decoding apparatus. The host processor may send appropriate commands and data to the encoding/decoding apparatus to control it to perform the data encoding/decoding operations and to generate and/or use an output required by applications executing on the host processor. To facilitate this, the host processor may execute a driver for the encoding/decoding apparatus.

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of a graphics processing system.

FIG. 1 shows an exemplary graphics processing system in which the technology described herein and the present embodiments may be implemented.

The exemplary graphics processing system shown in FIG. 1 comprises a host processor comprising a central processing unit (CPU) 1, a graphics processor (graphics processing unit (GPU)) 10, a video codec 2, a display controller 3, and a memory controller 4. As shown in FIG. 1, these units communicate via an interconnect 5 and have access to an off-chip memory system (memory) 6. In this system, the GPU 10, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processing unit 10 that is executing on the CPU 1. The driver 9 will then generate appropriate commands and data to cause the graphics processing unit 10 to render appropriate frames for display and store those frames in appropriate frame buffers, e.g. in main memory 6. The display controller 3 will then read those frames into a buffer for the display from where they are then read out and displayed on the display panel of the display 7.

As part of this processing, the graphics processor 10 will read in data, such as textures, geometry to be rendered, etc. from the memory 6, process that data, and then return data to the memory 6 (e.g. in the form of processed textures and/or frames to be displayed), which data will then further, e.g. as discussed above, be read from the memory, e.g. by the display controller 3, for display on the display 7. Thus there will need to be transfer of data to and from the graphics processor 10 (in particular to and from the processing cores of the graphics processor 10) and the memory 6.

In order to facilitate this, and to reduce the amount of data that needs to be transferred to and from memory during graphics processing operations, the data may be stored in a compressed form in the memory.

As the graphics processor 10 needs to operate on the data in an uncompressed form (and will produce data in an uncompressed form), this accordingly means that data that is stored in the memory in a compressed form will firstly need to be decompressed before being processed by the graphics processor. Correspondingly, data produced by the graphics processor 10 will first need to be compressed before being (finally) stored in the memory 6.

The present embodiments relate in particular to improved techniques for performing such compression and decompression of data between the memory 6 and the graphics processor 10.

Figure 2:
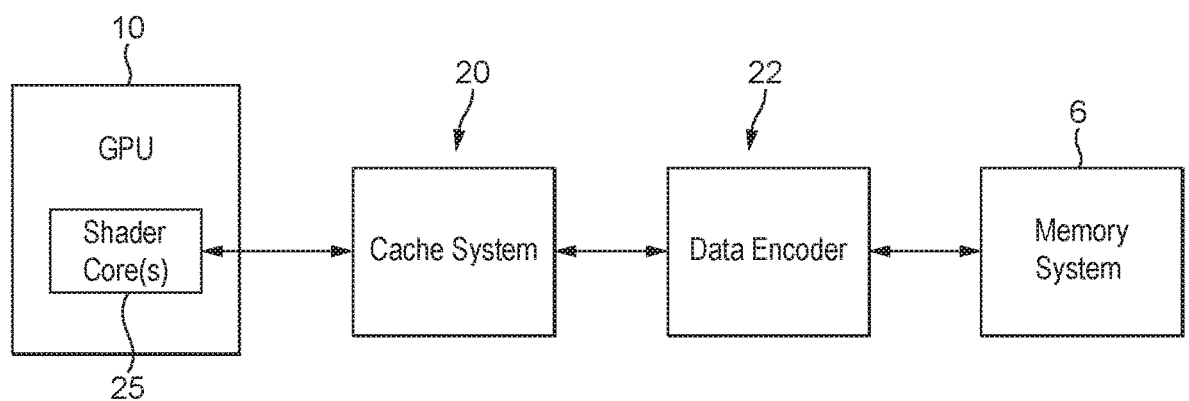
FIG. 2 shows in more detail the components of an exemplary graphics processing system in which the technology described herein may be implemented.

FIG. 2 shows schematically and in more detail the elements of the graphics processing system that are relevant to the operation of the present embodiments, and in particular to the transferring of data to and from the memory system 6 and the graphics processor 10 in a compressed form. As will be appreciated by those skilled in the art there may be other elements of the system, etc., that are not shown in FIG. 2.

FIG. 2 shows the memory system 6 and the graphics processor 10. As shown in FIG. 2, in between the memory system 6 and the graphics processor 10, there is a cache system 20 that is operable to transfer data from the memory system 6 to the graphics processor 10 (and in particular to the processing cores (shader cores) 25 of the graphics processor 10), and conversely to transfer data produced by the processing cores 25 of the graphics processor 10 back to the memory 6.

As shown in FIG. 2, in this embodiment data is transferred from the memory system 6 to the cache system 20, and then from the cache system 20 to the shader cores 25 (and vice-versa).

In order to facilitate the handling of compressed data from the memory system 6 (and for returning compressed data to the memory system 6) where that is required, as shown in FIG. 2, the cache system 20 has associated with it a data encoder/decoder 22, in this embodiment disposed between the cache system 20 and the memory system 6 (although other arrangements would of course be possible).

As will be discussed further below, this data encoder is operable to decompress data received from the memory system 6 and store that data in an uncompressed form in the cache system 20 for use by the shader cores 25 of the graphics processor, and, conversely, to compress data that is to be evicted from the cache system 20 prior to writing that data back to the memory system 6. The operation of this data encoder 22 will be discussed in more detail below.

Figure 3:
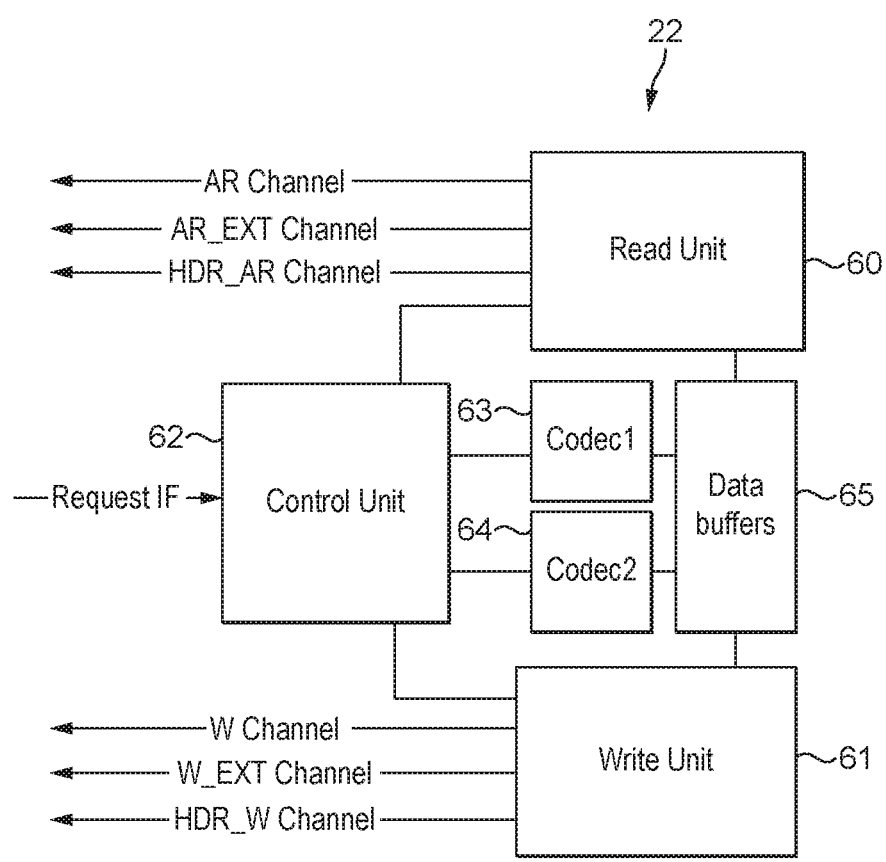
FIG. 3 shows an embodiment of the data encoder in more detail.

FIG. 3 shows an embodiment of the data encoder/decoder 22 in the present embodiments. As shown in FIG. 3, the (and each) data encoder includes respective read 60 and write 61 units (circuits) that are operable to, respectively, read data from the cache system and the memory system, and write data to the cache system and to the memory system. The data encoder/decoder 22 also includes an appropriate control unit (circuit) 62 that receives read and write requests from the shader cores and the cache controller and controls the data encoder/decoder 22 to respond to those requests accordingly and appropriately.

As shown in FIG. 3, the data encoder/decoder 22 also includes one or more codecs 63, 64 and a set of data buffers 65 for temporarily storing data in the data encoder/decoder 22 while that data is processed and/or while waiting to write that data to the cache system or the memory system.

The data encoder/decoder 22 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would, of course, be possible.

The codecs are typically each designed for operation with a certain pixel format, or set of pixel formats. For example, the data encoder/decoder 22 may be designed to be able to handle 'N' pixels represented using a particular pixel format during a processing cycle.

However, in use, data may need to be encoded by the data encoder/decoder 22 in a variety of different pixel formats, which may not match the pixel format(s) that the data encoder/decoder 22 is designed for.

For instance, during memory page compression, fixed-size memory pages (e.g. of 256 bytes) in different pixel formats may need to be compressed.

It will be appreciated that the number of pixels in a memory page block is different depending on the pixel format.

For example when a 256-byte memory page is represented using an R5G6B5 pixel format, the memory page will contain 128 pixels. On the other hand, when using R8G8B8A8 pixel format, the 256-byte memory page will contain only 64 pixels.

It may be desirable, or necessary, to encode the memory page block in a unified compression format (i.e. whichever format the data encoder is designed for operating with). However, if the data were to be encoded directly in a compression format that is different from its pixel format, this may result in low compression efficiency.

The present embodiments relate to how pixel data is handled by the data encoder/decoder 22. In particular, the encoding efficiency is improved by interleaving component bits when encoding a pixel buffer using an encoding scheme that is configured for compressing pixels in a particular compression format which is different from the pixel format in which the data is generated/received for encoding.

Figure 4:
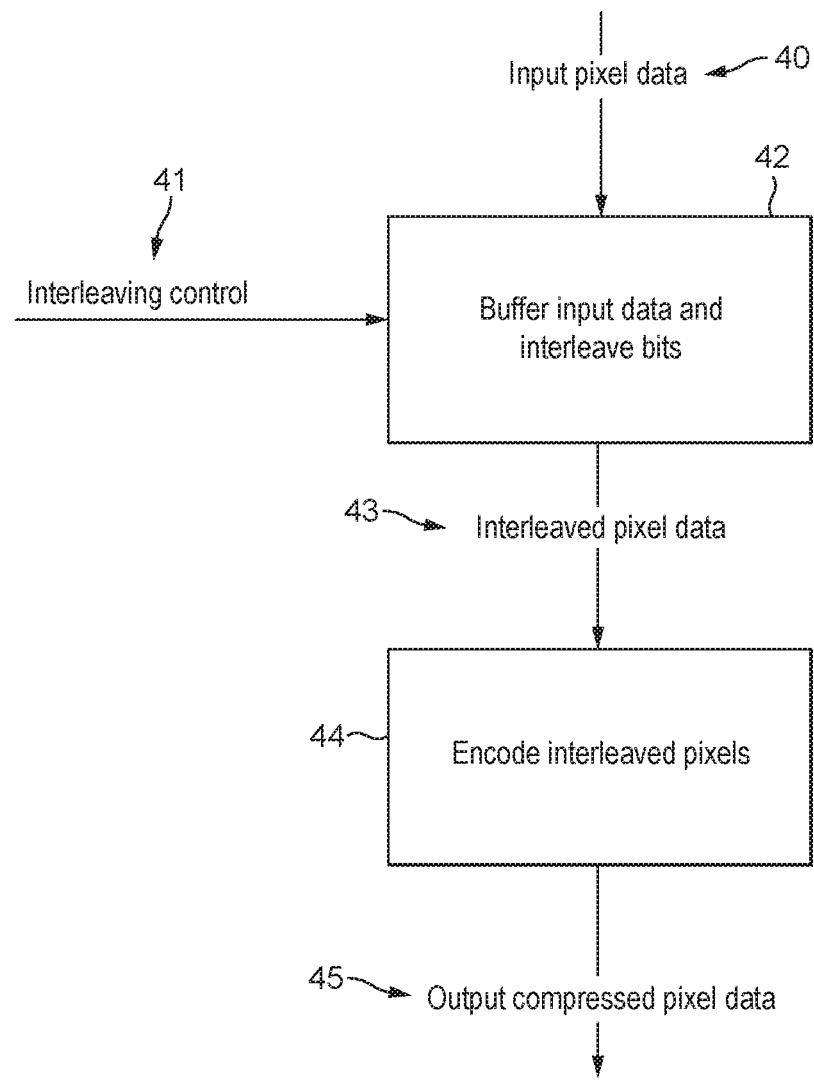
FIG. 4 shows schematically an example of an encoding process according to an embodiment of the technology described herein.

FIG. 4 illustrates an encoding operation according to the present embodiments. In the illustrated encoding operation, input pixel data is received (step 40) in a particular pixel format. The input pixel data is then passed into a suitable data conditioning circuit that buffers the input pixel data and re-orders the bits for the received pixels (step 42) to generate a set of interleaved pixel data in a different pixel format that matches the pixel format that the data encoder/decoder 22 is configured to process (step 43).

An interleaving control is performed (step 41) to control how the bits are re-ordered. For instance, the re-ordering may be predetermined based on the pixel format for the input pixel data and the target pixel format. In that case the re-ordering may be performed according to a fixed mapping. However, other arrangements would of course be possible. For example, the re-ordering may be configured by software.

The data encoder/decoder 22 then encodes the interleaved pixels (step 44) and outputs compressed pixel data (step 45) based on this encoding.

Figure 5:
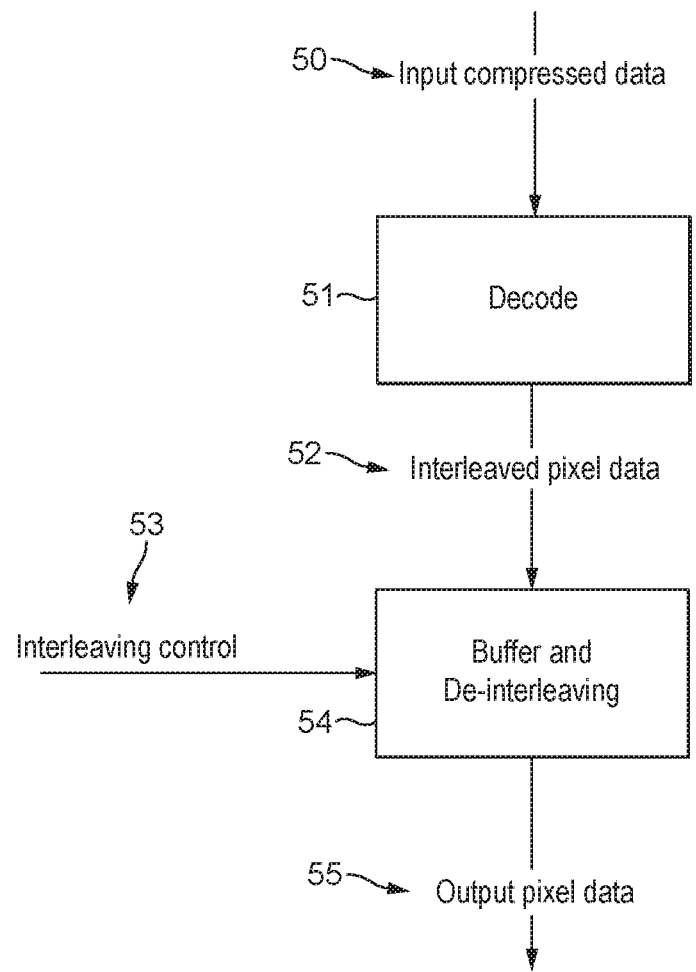
FIG. 5 shows schematically shows schematically an example of a decoding process according to an embodiment of the technology described herein.

FIG. 5 then illustrates a decoding operation according to the present embodiments. The decoding operation is essentially the inverse of the encoding operation described above.

Thus, compressed data is input to the data encoder/decoder 22 (step 50) and is then decoded (step 51) to generate a set of pixel data in the interleaved pixel format (step 52). The interleaved pixel data is then buffered and a reverse interleaving is performed (step 54) to generate pixel data for output (step 55) in the original pixel format.

The re-ordering performed during the decoding is the inverse of that performed during the encoding. To facilitate this, information identifying the re-ordering (i.e. the interleaving control at step 41 in FIG. 4) may be provided to the data encoder/decoder 22 along with the compressed data to allow the data encoder/decoder 22 to allow the data encoder/decoder 22 to determine how to re-order the bits to reconstruct the data in the desired, original data format (step 53).

By re-ordering the pixels in this way it is possible to match the input pixels to the size of pixel that the data encoder/decoder 22 is optimised to handle and therefore increase the encoding throughput.

It is also possible to enhance the efficiency of the encoding per se, e.g. by exploiting expected data similarity, e.g. based on data locality, in the input pixel data.

Various examples are contemplated in this regard, as illustrated in FIGS. 6 to 9.

FIG. 6 shows an example of a first bit interleaving method wherein bits from different components of the same pixel are interleaved to provide a better compression. In particular, as shown in FIG. 6, the bits for a pixel received in an R5G6B5 pixel format (with the components for the blue channel B[0], . . . , B[4] respectively included at bit positions 0, . . . , 4, the components for the green channel G[0], . . . , G[5] respectively included at bit positions 5, . . . , 10, and the components for the red channel R[0], . . . , R[4] respectively included at bit positions 11, . . . , 15) are re-ordered into a single component R16 pixel format with the re-ordering being performed in such a manner that the most significant bits for the different components (RGB) of the pixel received in the R5G6B5 pixel format are grouped together (in FIG. 6 such that the most significant bits G[5], R[4], G[4], B[4], are respectively included at bit positions 11 to 15, and so on) on the basis that it may be expected that the most significant bits have similar data values, and this may facilitate the compression.

FIG. 7 shows an example of another bit interleaving method wherein bits from the same component of different pixels are interleaved. For example, in FIG. 7, two R4G4B4A4 pixels are combined together into one R8G8B8A8 pixel for encoding. To facilitate the encoding, the same component bits (for the RGB components) for the two different pixels are grouped together, such that all of the red component bits for the different pixels are grouped together, and so on. (It is noted that for brevity FIG. 7 only show bit positions 8 to 31.)

Again, this may help provide better compression since there may be an expected data similarity between the different components.

In the examples in both FIG. 6 and FIG. 7 two or more smaller pixels are combined together to give a larger pixel for processing. However, it may also be the case that the input pixel format is larger than the desired encoding pixel format. In that case, as illustrated in FIG. 8, the larger pixel may be split into a number of smaller pixels of the target size.

For example, when an input pixel in R16G16B16A16 format is desired to be encoded in an R8G8B8A8 format, each 16-bit component of the input pixel may be split into two 8-bit component parts, as shown in FIG. 8. Again, this is desirably done such that most significant bits are grouped together, as in the example of FIG. 6.

Figure 9:
FIG. 9 shows an example of a fourth data bit interleaving scheme according to an embodiment of the technology described herein.

FIG. 9 illustrates another example in which input pixels in an YUV format are re-ordered into an RGB format for encoding. For instance, FIG. 9 shows an example of two 2×2 input blocks in YUV420 format that are to be encoded as an R4G4B4 pixel. In this example, the order of the 2×2 block is such that components Y0Y1Y2Y3 share the chroma values U0V0, whereas components Y4Y5Y6Y7 share the chroma values U1V1. The Y components are then shuffled inside the two 2×2 blocks so that the Y0Y1Y2Y3 components map to the red channel of the R4G4B4 pixel, whereas the Y4Y5Y6Y7 map to the blue channel.

This helps ensure that the original pixels in the YUV format (i.e. the first pixel having components Y0Y1Y2Y3 and the second pixel having components Y4Y5Y6Y7) are mapped to the same RGB component which may be expected to provide better compression (since the Y0Y1Y2Y3 component values mapped to the R channel are expected to have similar data values and therefore compress better).

Although the present embodiments have been discussed above in the context of encoding data when it is being written from a cache system to the memory system for storing the data in the memory system in a compressed format, it will be appreciated that the technology described herein may be used for any other instances where it is desired to compress data, e.g. as it is being written to storage, or transmitted.

Further, although the present embodiments have been discussed above with particular reference to a graphics processor in a graphics processing system, the Applicants have recognised that the use of a data encoder in the manner of the present embodiments discussed above would be useful in other data processing arrangements and systems, and not just in the context of graphics processors.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processing system when processing arrays of data elements,
the data processing system comprising:
a data encoder operable to perform a first encoding scheme that is configured for processing sets of data arranged in a first data format, the first data format using a first arrangement of bits to represent an element of an array of data elements, the data encoder thus being operable to encode one or more sets of data provided in the first data format as an encoded data packet using the first encoding scheme;
the method comprising:
receiving for encoding by the data encoder a plurality of sets of data in a second, different data format, the second data format representing an element of an array of data elements using a second, different arrangement of bits, each of the received sets of data in the second data format thus comprising a respective sequence of bits for representing an associated element of an array of data elements in the second format;
re-ordering bits for at least some of the received plurality of sets of data in the second data format to map the bits for the at least some of the received plurality of sets of data in the second data format into the first arrangement of bits associated with the first data format to thereby generate from the received plurality of sets of data in the second data format one or more sets of data in the first data format, wherein the number of sets of data generated in the first data format through the re-ordering of the bits is different to the number of sets of data received in the second data format; and
the data encoder processing the generated sets of data in the first data format using the first encoding scheme to thereby encode the received plurality of sets of data in the second data format as one or more encoded data packets associated with the first data format.

2. The method of claim 1, wherein the step of re-ordering bits for at least some of the received plurality of sets of data in the second data format to map the bits for the at least some of the received plurality of sets of data in the second data format into the first arrangement of bits associated with the first data format comprises: combining together a plurality of sets of data in the second data format into a single set of data in the first data format.

3. The method of claim 1, wherein the step of re-ordering bits for at least some of the received plurality of sets of data in the second data format to map the bits for the at least some of the received plurality of sets of data in the second data format into the first arrangement of bits associated with the first data format comprises: splitting a set of data in the second data format into a plurality of sets of data in the first data format.

4. The method of claim 1, wherein the re-ordering of the bits for the at least some of the received plurality of sets data in the second data format is performed based on an expected data similarity.

5. The method of claim 4, wherein the re-ordering of the bits is performed to arrange together, in the generated sets of data in the first data format, most significant bits for components of a single data element and/or for components of different data elements.

6. The method of claim 4, wherein the re-ordering of the bits is performed to arrange together, in the generated sets of data in the first data format, bits representing a particular component of one or more data elements.

7. The method of claim 1, wherein the arrays of data elements represent a spatial distribution of values.

8. The method of claim 7, wherein the arrays of data elements represent image data, and wherein the sets of data represent individual pixels within an array of image data.

9. The method of claim 1, wherein information is provided for identifying the re-ordering of the bits used to generate the one or more sets of data in the first data format that are processed by the data encoder for use when decoding the encoded data packet.

10. A data processing system for processing arrays of data elements,
the data processing system comprising:
a data encoder configured to perform a first encoding scheme that is configured for processing sets of data arranged in a first data format, the first data format using a first arrangement of bits to represent an element of an array of data elements, the data encoder thus being configured to encode one or more sets of data provided in the first data format as an encoded data packet using the first encoding scheme; and
a data conditioning circuit associated with the data encoder, wherein the data conditioning circuit is configured to re-order bits for at least some of a plurality of sets of data having a second, different data format, the second data format representing an element of an array of data elements representing a spatial distribution of values using a second, different arrangement of bits, to map the bits for the at least some of the plurality of sets of data in the second data format into the first arrangement of bits associated with the first data format to thereby generate from the plurality of sets of data in the second data format one or more sets of data in the first data format wherein the number of sets of data generated in the first data format through the re-ordering of the bits is different to the number of sets of data received in the second data format, and to provide the generated sets of data in the first data format to the data encoder for processing.

11. The system of claim 10, wherein the data conditioning circuit is configured to combine together a plurality of sets of data in the second data format into a single set of data in the first data format.

12. The system of claim 10, wherein the data conditioning circuit is configured to split a set of data in the second data format into a plurality of sets of data in the first data format.

13. The system of claim 10, wherein the re-ordering of the bits for the at least some of the received plurality of sets data in the second data format by the data conditioning circuit is performed based on an expected data similarity.

14. The system of claim 13, wherein the re-ordering of the bits by the data conditioning circuit is performed to arrange most significant bits together for components of a single data element and/or for components of different data elements.

15. The system of claim 13, wherein the re-ordering of the bits by the data conditioning circuit is performed to arrange bits representing a particular component of one or more data elements together.

16. The system of claim 10, wherein the arrays of data elements represent a spatial distribution of values.

17. The system of claim 16, wherein the arrays of data elements represent image data, and wherein the sets of data represent individual pixels within an array of image data.

18. The system of claim 10, wherein information is provided for identifying the re-ordering of the bits used to generate the one or more sets of data in the first data format that are processed by the data encoder for use when decoding the encoded data packet.

19. A data processing system for processing arrays of data elements,
the data processing system comprising:
a data decoder operable to perform a first decoding scheme that is configured for decoding one or more encoded data packets into one or more sets of data arranged in a first data format, the first data format using a first arrangement of bits to represent an element of an array of data elements; and
a data conditioning circuit associated with the data decoder, wherein the data conditioning circuit is configured to re-order bits for at least some of a plurality of decoded sets of data in the first data format from the data decoder to map the bits into a second, different arrangement of bits associated with a second, different data format, the second data format representing an element of an array of data elements representing a spatial distribution of values using the second arrangement of bits, to thereby generate from the sets of data in the first data format one or more sets of data in the second data format, wherein the number of sets of data generated in the second data format through the re-ordering of the bits is different to the number of sets of data generated in the first data format using the first decoding scheme.

20. A method of operating a data processing system when processing arrays of data elements,
the data processing system comprising:
a data encoder operable to perform a first encoding scheme that is configured for processing sets of data arranged in a first data format, the first data format using a first arrangement of bits to represent an element of an array of data elements, the data encoder thus being operable to encode one or more sets of data provided in the first data format as an encoded data packet using the first encoding scheme;
the method comprising:
receiving for encoding by the data encoder a plurality of sets of data in a second, different data format, the second data format representing an element of an array of data elements using a second, different arrangement of bits, each of the received sets of data in the second data format thus comprising a respective sequence of bits for representing an associated element of an array of data elements in the second format;
re-ordering bits for at least some of the received plurality of sets of data in the second data format to map the bits for the at least some of the received plurality of sets of data in the second data format into the first arrangement of bits associated with the first data format to thereby generate from the received plurality of sets of data in the second data format one or more sets of data in the first data format, wherein the re-ordering of the bits for the at least some of the received plurality of sets data in the second data format is performed to arrange together, in the generated sets of data in the first data format, most significant bits for components of a single data element and/or for components of different data elements; and
the data encoder processing the generated sets of data in the first data format using the first encoding scheme to thereby encode the received plurality of sets of data in the second data format as one or more encoded data packets associated with the first data format.

21. A method of operating a data processing system when processing arrays of data elements,
the data processing system comprising:
a data encoder operable to perform a first encoding scheme that is configured for processing sets of data arranged in a first data format, the first data format using a first arrangement of bits to represent an element of an array of data elements, the data encoder thus being operable to encode one or more sets of data provided in the first data format as an encoded data packet using the first encoding scheme;
the method comprising:
receiving for encoding by the data encoder a plurality of sets of data in a second, different data format, the second data format representing an element of an array of data elements using a second, different arrangement of bits, each of the received sets of data in the second data format thus comprising a respective sequence of bits for representing an associated element of an array of data elements in the second format;
re-ordering bits for at least some of the received plurality of sets of data in the second data format to map the bits for the at least some of the received plurality of sets of data in the second data format into the first arrangement of bits associated with the first data format to thereby generate from the received plurality of sets of data in the second data format one or more sets of data in the first data format, wherein each of the data elements in the second, different data format represent an individual element having a set of multiple components, and wherein the re-ordering of the bits for the at least some of the received plurality of sets data in the second data format is performed to arrange together, in the generated sets of data in the first data format, bits representing a single one of the components for a plurality of data elements in the second data format; and the data encoder processing the generated sets of data in the first data format using the first encoding scheme to thereby encode the received plurality of sets of data in the second data format as one or more encoded data packets associated with the first data format.

\* \* \* \* \*